(12) United States Patent
Fromson et al.

(10) Patent No.: US 6,486,092 B2
(45) Date of Patent: Nov. 26, 2002

(54) CATALYST STRUCTURE WITH CATALYST SUPPORT PARTICLES FORGED INTO SUBSTRATE SURFACE AND METHOD OF MANUFACTURE

(75) Inventors: Howard A. Fromson, 43 Main St., Stonington, CT (US) 06378; William J. Rozell, Vernon, CT (US)

(73) Assignee: Howard A. Fromson, Stonington, CT (US)

( * ) Notice: Subject to any disclaimer, the term of this patent is extended or adjusted under 35 U.S.C. 154(b) by 0 days.

(21) Appl. No.: 09/940,136

(22) Filed: Aug. 27, 2001

(65) Prior Publication Data

US 2002/0037809 A1 Mar. 28, 2002

Related U.S. Application Data

(63) Continuation-in-part of application No. 09/590,736, filed on Jun. 8, 2000, now Pat. No. 6,281,159.

(51) Int. Cl.⁷ .............................. B01J 21/34; B01J 33/00
(52) U.S. Cl. ..................... 502/324; 502/439; 427/31.8
(58) Field of Search .................. 502/439, 324, 502/345, 337, 338, 350, 319, 343; 427/359, 368, 369

(56) References Cited

U.S. PATENT DOCUMENTS

| | | | |
|---|---|---|---|
| 3,652,317 A | 3/1972 | Della Porta et al. | 117/22 |
| 3,746,658 A | 7/1973 | Porta et al. | 252/439 |
| 3,891,516 A | 6/1975 | Chu | 204/33 |
| 4,206,083 A | 6/1980 | Chang | 252/455 R |
| 4,343,776 A | 8/1982 | Carr et al. | 423/210 |
| 4,765,874 A | 8/1988 | Modes et al. | 204/105 R |
| 5,187,137 A | 2/1993 | Terui et al. | 502/241 |
| 5,262,129 A | 11/1993 | Terada et al. | 422/122 |
| 5,363,278 A | 11/1994 | Komorita et al. | 361/762 |
| 5,422,331 A | 6/1995 | Galligan et al. | 502/333 |
| 5,492,769 A | 2/1996 | Pryor et al. | 428/552 |
| 5,693,207 A | 12/1997 | Fromson et al. | 205/112 |
| 5,916,840 A | 6/1999 | Ebner et al. | 502/331 |
| 5,997,831 A | 12/1999 | Dettling et al. | 423/219 |
| 6,083,871 A | 7/2000 | Fromson et al. | 502/439 |
| 6,145,565 A | 11/2000 | Fromson et al. | 156/580 |
| 6,281,159 B1 | 8/2001 | Fromson et al. | 502/324 |

FOREIGN PATENT DOCUMENTS

GB 2 340 775 A 3/2000

*Primary Examiner*—Stanley S. Silverman
*Assistant Examiner*—Christina Ildebrando
(74) *Attorney, Agent, or Firm*—Alix, Yale & Ristas, LLP

(57) ABSTRACT

A catalyst structure is formed by forging catalyst support particles from a slurry into the surface of a metal substrate such that the particles protrude from the surface and are permanently fixed into the surface. The forging is accomplished by engaging rollers with the surface as it passes through the slurry to press the particles into the surface. The rollers may be brush rollers, fabric rollers or solid rollers. The particles may be any particles which are capable of having a catalyst deposited thereon and which are hard enough to forge into the metal substrate. The catalyst material is then deposited onto the catalyst support particles.

15 Claims, No Drawings

CATALYST STRUCTURE WITH CATALYST SUPPORT PARTICLES FORGED INTO SUBSTRATE SURFACE AND METHOD OF MANUFACTURE

This application is a continuation-in-part of U.S. patent application Ser. No. 09/590,736 filed Jun. 8, 2000, now U.S. Pat. No. 6,281,159.

BACKGROUND OF THE INVENTION

The present invention relates to a catalyst structure comprising a substrate having protruding catalyst support particles permanently fixed into the surface of the substrate with a catalyst deposited thereon and to the method of manufacture.

Catalyst structures have been disclosed in the prior art which involve the placement of catalyst materials onto the surface of a substrate. At least one of the uses for these prior art catalytic structures is for the conversion of atmospheric ozone to molecular oxygen as well as the conversion of other airborne pollutants such as carbon monoxide and unburned hydrocarbons into harmless compounds such as carbon dioxide and water vapor. One particular use has been for the construction of automotive heat exchangers such as radiators and air conditioning condensers.

U.S. Pat. No. 4,206,083 discloses the co-precipitation of platinum, palladium and manganese oxide on a ceramic support forming a catalyst for the decomposition of ozone in air. The ceramic support is impregnated with a solution containing the precursors of the desired catalyst. The impregnated support is then dried and heated to produce platinum and palladium metal and manganese oxide.

In U.S. Pat. No. 4,343,776, an ozone abatement catalyst is described having a carrier or support of a porous refractory skeletal structure or metal monoliths of aluminum or other materials preferably having a plurality of flow-through channels. A platinum group metal and a non-precious Group VIII metal oxide or aluminate, such as an oxide or aluminate of iron, cobalt and nickel, are applied to the external surface of the carrier or support with the metal oxide or aluminate being applied with an alumina slip preferably prior to the application of the platinum group metal.

U.S. Pat. No. 5,187,137 likewise discloses an ozone decomposing catalyst comprising a manganese oxide together with palladium or palladium oxide formed as a thin film on a support. The support may be formed from various metal oxides or it may be a metal support. The catalyst is applied to the support as a thin film preferably with an alumina sol as a binder.

Another catalyst composition which is described as being adapted for ozone abatement is disclosed in U.S. Pat. No. 5,422,331. This catalytic material comprises a substrate, which may be aluminum, with an undercoat layer containing a mixture of fine particulate refractory metal oxide and a sol such as a silica sol providing good adherence to the substrate. An overlayer also contains a refractory metal oxide on which is dispersed a catalytic metal component, such as palladium and manganese components, which is then calcined.

U.S. Pat. No. 5,997,831 specifically discloses a method of treating the atmosphere to convert pollutants such as ozone, hydrocarbons and carbon monoxide to harmless compounds involving contacting the atmosphere with a heat exchanger which has an outer surface coated in selected areas with a catalytic layer. The catalyst may be manganese oxide and/or precious metals applied by dipping or spraying and the catalytic layer is coated with a porous protective coating such as a polymer.

Another catalyst structure is disclosed in the copending U.S. patent application Ser. No. 09/590,736 filed Jun. 8, 2000 by the inventors of the present application in which catalyst particles are dispersed over and forged into the surface of a metal substrate member with the catalyst particles protruding from and fixed to the substrate.

SUMMARY OF THE INVENTION

The present invention relates to a method of forming a catalytic structure particularly suited to the treatment of the atmosphere to remove atmospheric pollutants. The invention relates specifically to the formation of catalysts for the decomposition of ozone to form molecular oxygen but is also applicable to catalyst materials for a range of other reactions including, for example, the decomposition of hydrocarbons and the oxidation of carbon monoxide. An object of the invention is to provide an improved method of forming a metal substrate having a surface with particles dispersed over and fixed to the surface which protrude from the surface and which comprise a support and a catalytic material.

The invention involves forming a catalytic structure having catalyst support particles dispersed over and forged into the surface of a substrate member whereby the particles are protruding from and permanently fixed to the substrate. The substrate is a metal sheet or body, preferably aluminum or copper. A slurry containing catalyst support particles which are capable of being forged into the surface of the substrate is applied to the surface of the substrate and the particles are pressed against the surface of the substrate to fixedly forge the particles into the surface. The substrate is preferably in web form and the slurry is continuously applied. Pressing the particles against the surface is preferably accomplished with a rotating brush, a fabric or so-called molleton roller or solid rollers such as a solid metal roller or hard rubber roller. The catalyst support particles may comprise any particulate material which is capable of absorbing and supporting the catalyst material and which is capable of being forged into the substrate surface. The catalyst material is then applied to the forged catalyst support particles.

DESCRIPTION OF THE PREFERRED EMBODIMENTS

The invention begins with a substrate member which is formed of a metal capable of having catalyst support particles forged into the surface. In the preferred form, the substrate is a web of the substrate material which is continuously treated in accordance with the invention to be described and which may then be cut into desired catalytic structural shapes. However, the substrate may also be individual sheets or shaped members. The preferred substrate material is aluminum or copper but other metallic substrates can be used.

The particles for use in the present invention comprise any particulate material which is capable of absorbing and supporting a catalyst material and which is capable of being forged into the surface of the substrate. That is, the particulate catalytic support material must be hard enough to be pressed and forged into the substrate surface. The preferred support particles are oxide particles because they are hard enough to forge and they are particularly effective catalyst supports. Examples of particulate support materials include the natural and synthetic zeolites and the following minerals:

| MgO | α-Al$_2$O$_3$ | CaC | TiO$_2$ |
| Ca$_2$SiO$_4$ | MgAl$_2$O$_4$ | BaC | MgCr$_2$O$_4$ |
| Ca$_3$SiO$_5$ | ZnCr$_2$O$_4$ | ThO$_2$ | ZnAl$_2$O$_4$ |
| ZrO$_2$ | CaSiO$_3$ | CeO$_2$ | γ-Al$_2$O$_3$ |
| Cr$_2$O$_3$ | SiO$_2$ | La$_2$O$_3$ | SiO$_2$—Al$_2$O$_3$ |

For a detailed discussion of catalyst support materials, reference is made to the book entitled *Principles of Catalyst Development* by James T. Richardson published by Plenum Press, copyright 1989, and specifically to pages 28 to 35.

In the present invention, the catalyst support particles are forged into the surface of the substrate from a slurry. By this forging action, the particles actually penetrate into the surface whereby they are firmly captured by the forged substrate material but still substantially exposed at the surface. Although an aqueous slurry is preferred, the slurry could be formed from any desired liquid.

The forging of the support particles into the substrate in the present invention takes place by applying the slurry to the substrate and pressing the particles in the slurry against the substrate with a force sufficient to forge the particles partially into the substrate such that the particles protrude from the surface and such that the particles are permanently fixed into the substrate. The preferred method is to continuously treat a web of the substrate material although the invention is equally applicable to the treatment of individual sheets of substrate or to specific objects formed of the substrate material such as fan or propeller blades. As the slurry is applied to the surface of the substrate material, the substrate is engaged by one or usually a series of rotating pressure cylinders or rolls which force the particles into the substrate. However, an excessive number of rolls or an excessive number of passes through the rolls will result in the particles being fully forged into the substrate whereby they no longer protrude from the surface resulting in a reduction of the exposure of the particles and in the ultimate catalytic efficiency. The pressure cylinders or rolls are preferably brush rolls, of the same type as used for the brush graining of plates, or molleton rolls which are fabric rolls such as used for polishing. However, solid rolls can also be used such as metal rolls or hard rubber rolls.

Several factors impact on the selection of the specific operating conditions for the forging process. The hardness and cutting nature of the catalytic support particles being forged and the hardness of the metal or alloy being used as the substrate are significant factors. Each catalytic reaction for which a catalytic support structure is being prepared will have an optimum size and distribution condition for the catalyst that will yield an optimum catalytic efficiency. Thus the selection of variables such as the particle size, concentration of particles in the slurry, roller pressure and the rotation rate of the roller will vary with each specific application.

The next step in the formation of the catalyst structure is the application of the active catalyst material to the catalyst support particles. Merely as examples, active catalyst materials such as platinum, palladium and rhodium or catalytic oxides such as manganese oxide may be deposited on the catalyst support particles or combinations thereof. Any of the conventional catalyst deposition techniques may be employed such as precipitation, adsorption, ion exchange and impregnation. For a description of deposition techniques, reference is made to the book, *Principles of Catalyst Development*, previously referred to and specifically to pages 108 to 120.

The present invention produces a catalyst structure having a metal substrate with catalyst containing particles dispersed over at least one of the surfaces of the substrate and with these catalyst containing particles being forged into the surface whereby they are fixed in place. This permits the structure to be handled, cut, shaped and fabricated into products such as heat exchanger parts without destroying the catalytic surface such as by spalling of a coating. The particles on the surface also increase the surface area and create turbulence which results in the beneficial mixing of the air or other fluid flowing over the surface to increase the contact between the reactants and the catalyst.

What is claimed is:

1. A method of forming a catalytic structure comprising catalyst particles dispersed over and forged into a surface of a substrate comprising the steps of:

(a) providing a substrate;

(b) forming a slurry of catalyst support particles of a composition capable of being forged into a surface of said substrate;

(c) applying said slurry to said substrate;

(d) pressing said catalyst support particles in said slurry against said surface of said substrate with a force sufficient to forge said particles partially into said surface thereby permanently fixing said particles to said substrate and leaving said particles protruding from said surface; and (e) depositing an active catalyst material by precipitation, adsorption, ion exchange, or impregnation on said catalyst support particles.

2. A method as recited in claim 1 wherein said substrate comprises a web.

3. A method as recited in claim 1 wherein said active catalyst material comprises an ozone decomposing catalyst.

4. A method as recited in claim 1 wherein said active catalyst material comprises a manganese oxide.

5. A method as recited in claim 4 wherein said manganese oxide comprises manganese dioxide.

6. A method as recited in claim 1 wherein said substrate comprises aluminum.

7. A method as recited in claim 1 wherein said substrate comprises copper.

8. A method as recited in claim 1 wherein said substrate is metal.

9. A method as recited in claim 1 wherein said substrate and said surface of said substrate are planar.

10. A method as recited in claim 1 wherein said step of pressing said catalyst support particles against said surface of said substrate comprises rotating a cylinder in engagement with said surface with said slurry applied thereto.

11. A method as recited in claim 10 wherein said cylinder comprises a rotating brush or molleton roll.

12. A method as recited in claim 10 wherein said cylinder comprises a solid roll.

13. A method of forming planar catalytic sheet material capable of being cut and shaped into extended heating surfaces for heat exchanges wherein said planar catalytic sheet material comprises catalytic particles dispersed over and forged into a surface of a substrate sheet comprising the steps of:

(a) providing an elongated planar web of forgeable substrate sheet material;

(b) forming a slurry of catalyst support particles capable of being forged into a surface of said web;

(c) continuously moving said web and applying said slurry thereto;

(d) pressing said catalyst support particles in said slurry against said surface of said substrate with a force sufficient to forge said particles partially into said surface thereby permanently fixing said particles to said substrate and leaving said particles protruding from said surface; and (e) depositing an active catalyst material by precipitation, adsorption, ion exchange or impregnation on said catalyst support particles.

14. A method as recited in claim 13 wherein said step of pressing comprises rotating at least one graining brush in engagement with said web with said slurry thereon.

15. A method as recited in claim 13 wherein said step of pressing includes pressing said catalyst support particles against both surfaces of said web.

\* \* \* \* \*